W. B. ALEXANDER.
COTTON CHOPPER.
APPLICATION FILED JULY 26, 1909.
942,371.
Patented Dec. 7, 1909.
2 SHEETS—SHEET 2.
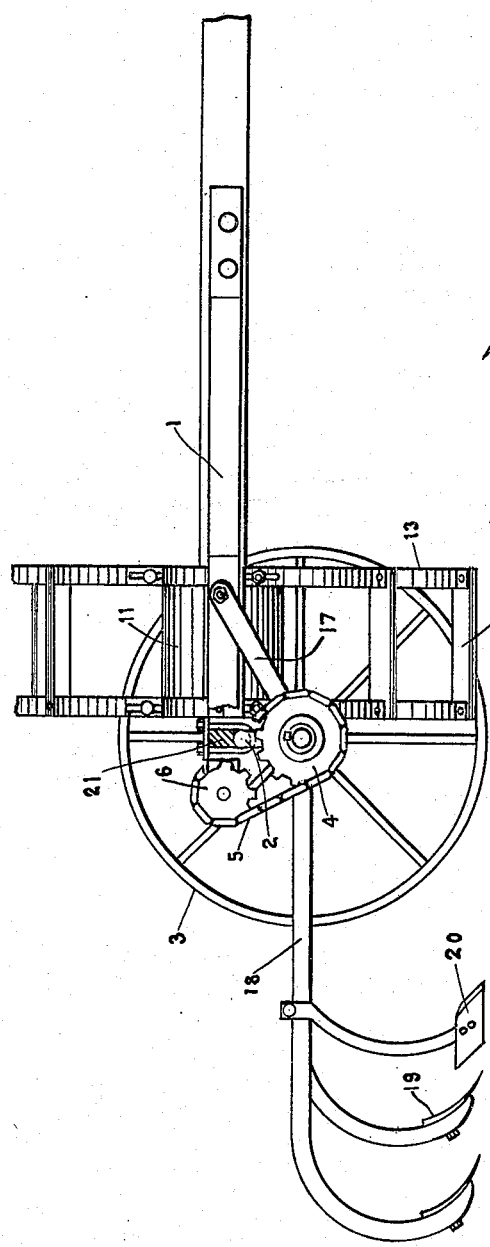
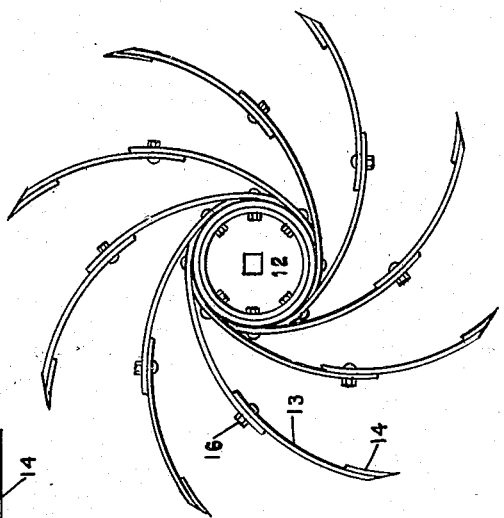
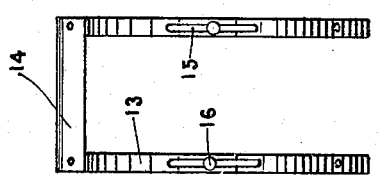
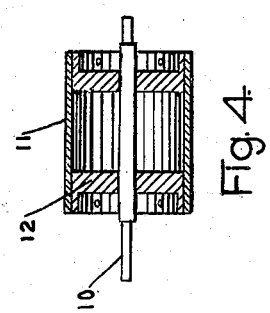
WITNESSES:
L. McDonald
J. S. Murray
INVENTOR.
Winston B. Alexander
BY John M. Spellman
ATTORNEY.

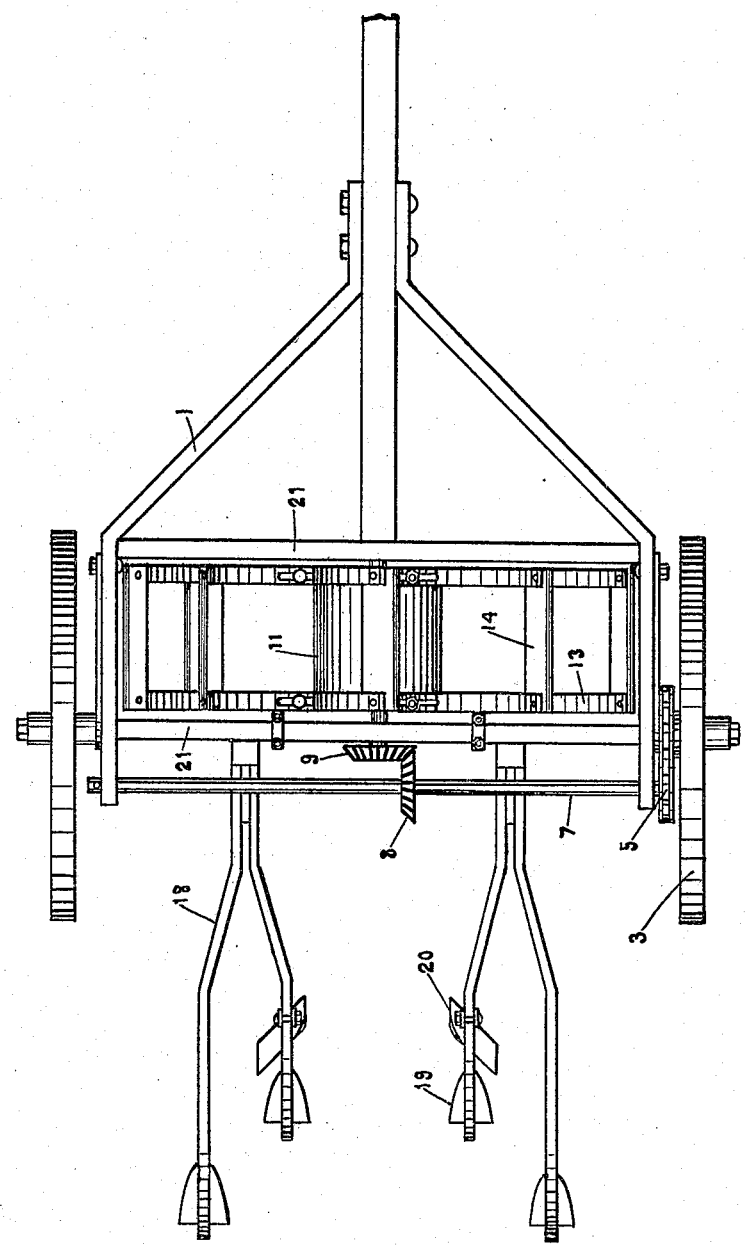

UNITED STATES PATENT OFFICE.

WINSTON B. ALEXANDER, OF DALLAS, TEXAS.

COTTON-CHOPPER.

942,371.

Specification of Letters Patent.

Patented Dec. 7, 1909.

Application filed July 26, 1909. Serial No. 509,687.

*To all whom it may concern:*

Be it known that I, WINSTON B. ALEXANDER, a citizen of the United States, residing at Dallas, in the county of Dallas and State of Texas, have invented certain new and useful Improvements in Cotton-Choppers, of which the following is a specification.

My invention relates to new and useful improvements in cotton choppers. Its object is to provide a cotton chopper which will mechanically perform the work of "blocking out" cotton, or chopping the continuous rows of plants into equidistant hills, and which will accomplish a saving of time and labor over the manual performance of this operation.

A further object is to provide a cotton chopper equipped with a plurality of rotating knives as chopping means, rotation being imparted to the knives by the forward motion of the wheels of the vehicle.

Finally the object of the invention is to provide a device of the character described, which will be strong, durable, simple and efficient, and comparatively easy to produce, and also one in which the various parts will not be likely to get out of working order.

With these and various other objects in view, my invention has relation to certain novel features of construction and operation, an example of which is described in the following specification, and illustrated in the accompanying drawings, wherein:

Figure 1 is a top view of the cotton chopper complete. Fig. 2 is a side elevation of the same, the near wheel being removed, and a portion of the frame and sprocket wheel being broken away, to show the parts hidden thereby. Fig. 3 is an end view of the drum, showing how the chopper knives are resiliently supported therefrom. Fig. 4 is a longitudinal section taken through the axis of the revolving drum, shown in Fig. 3. Fig. 5 is a view of one of the chopping knives with the arms attached whereby the knife is supported from the drum of Fig. 4.

Referring now more particularly to the drawings, wherein like numerals of reference designate similar parts in all the figures, the numeral 1 denotes the frame of the cotton chopper, which is upheld by an axle 2, the extremities of which are journaled in transporting wheels 3. A sprocket wheel 4, rigidly attached to one of the wheels 3, communicates rotation by means of the chain 5, to the sprocket wheel 6, fast upon the shaft 7. A miter gear 8 is also mounted fast upon the shaft 7, and serves to communicate rotation to a miter gear 9, fast upon the shaft 10 of the drum 11. This drum is rigid with the shaft, and is provided with walls 12 at each extremity, to receive the shaft.

A plurality of curved arms 13 extend in pairs from the drum, a chopping knife 14 being attached at the extremity of each pair of arms. Each of these arms consists of two parts, the connected extremities of which overlap, and are provided with slots 15, to receive a bolt 16, adjustment of the length of the arm thus being made possible. These arms are preferably to be made of resilient steel, so that when the knives strike an unyielding obstacle, the arms will yield sufficiently to avoid their breakage. The axle 2 is of "goose-neck" construction, and is provided at either side with braces 17 extending to the frame 1, to prevent the axle from turning.

At each side of the machine, cultivator beams 18 are attached carrying the plows 19. Each beam also carries a scraper 20, set at an angle to the direction of travel, and designed to scrape away grass and weeds from the cotton plants. The plows 19 are attached at the rear of the scrapers, so that they serve to replace the soil upon the plants, which the scrapers remove. The cross beams 21 of the frame provide bearings for the extremities of the drum shaft 10.

Since the arms 13 are adjustable in length, the depth of the stroke of the chopping knives may be regulated as desired. Eight of these arms are shown on the drawings, but it is obvious that the number of these arms may be varied without any departure from the spirit of the invention.

The distance between the hills of a row will be dependent upon the speed of rotation of the drum carrying the chopping knives, and since this speed is a function of the size of the sprocket wheels 4 and 6, these wheels may be made of a size to give any required distance between the hills.

What I claim is:

In a cotton chopper, the combination with the frame, axle, and transporting wheels thereof, of a drum rotatably mounted in the frame longitudinal of the chopper, a spindle upon which the drum is fast, a shaft transverse of the machine, a pair of beveled gears communicating rotation from the shaft to the spindle, chain and sprocket wheel mechanism communicating rotation from a transporting wheel to said shaft, a plurality of curved, resilient, two-part arms, extending from the drum, the length of said arms being adjustable, and a plurality of chopping knives mounted upon the extremities of said arms.

In testimony whereof I have signed my name to this specification in the presence of two subscribing witnesses.

WINSTON B. ALEXANDER.

Witnesses:
J. S. MURRAY,
G. B. COULSON.